United States Patent [19]

Ewell

[11] Patent Number: 4,805,171
[45] Date of Patent: Feb. 14, 1989

[54] UNITARY PCM RATE CONVERTER AND MULTIFRAME BUFFER

[75] Inventor: LuJack Ewell, Atlanta, Ga.

[73] Assignee: Solid State Systems, Inc., Kennesaw, Ga.

[21] Appl. No.: 71,979

[22] Filed: Jul. 10, 1987

[51] Int. Cl.$^4$ ................................................ H04J 3/02
[52] U.S. Cl. ................................. 370/110.1; 370/112; 370/15
[58] Field of Search ...................... 370/110.1, 112, 55, 370/13, 15, 65, 84

[56] References Cited

U.S. PATENT DOCUMENTS

| | | | |
|---|---|---|---|
| 4,322,844 | 3/1982 | Fellinger et al. | 370/84 |
| 4,488,294 | 12/1984 | Christensen et al. | 370/110.1 |
| 4,551,830 | 11/1985 | Huffman | 370/15 |
| 4,580,279 | 4/1986 | Kahn | 375/118 |
| 4,675,862 | 6/1987 | Banzi, Jr. et al. | 370/15 |

FOREIGN PATENT DOCUMENTS 0100614 2/1984 European Pat. Off. .

OTHER PUBLICATIONS

Microelectronic Products Data Book, Issue 1, Mitel Semiconductor, pp. 2-109 through 2-128, MH 89750, DS-1/T1 Digital Trunk Interface, Preliminary Information, Issue 2, Jan. 1985.

Primary Examiner—Douglas W. Olms
Assistant Examiner—Min Jung
Attorney, Agent, or Firm—Jones, Askew & Lunsford

[57] ABSTRACT

A PCM rate conversion module is provided for interfacing a thirty-two channel PBX with a twenty-four channel link. The PCM conversion circuitry includes an inbound data memory station and an outbound data memory station wherein inbound T1 data is looped back out to the T1 data link and outbound PBX data is looped back out to the PBX. The looping provides effective and reliable testing of the rate conversion apparatus.

49 Claims, 4 Drawing Sheets

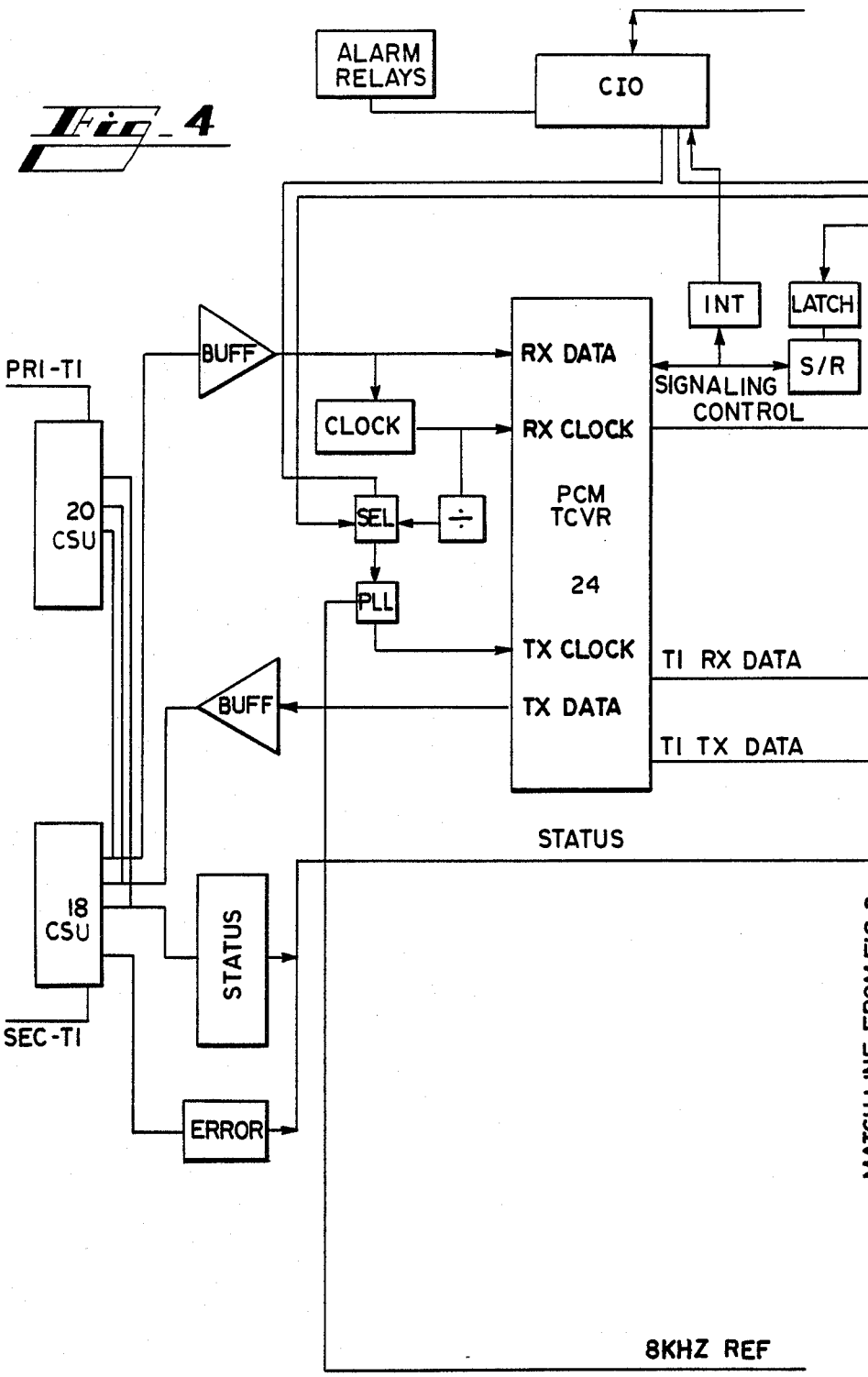
Fig_4

UNITARY PCM RATE CONVERTER AND MULTIFRAME BUFFER

CROSS-REFERENCE TO RELATED APPLICATIONS

The subject matter described in this application is related to the material disclosed in co-filed U.S. patent applications Ser. Nos. 072,249 "SPACE AND TIME SWITCH"—Reginald Ratcliff; 072,054 "SPACE AND TIME SWITCH"—Reginald Ratcliff; and 072,254 "CONFERENCING BRIDGE"—Reginald Ratcliff; assigned to the assignee of the present application.

TECHNICAL FIELD

This invention generally pertains to communications transmission systems, and more particularly, to a PCM converter for a telephone communications system wherein a PBX operates at a different data rate than a T1 data link. The PCM converter interfaces the T1 data link and the PBX.

BACKGROUND ART

A private branch exchange telephone system ("PBX") provides certain advantages, such as reduced cost compared to an equal number of individual private lines. This has caused rapid growth in the number of PBX telephone systems. Increased use has spurred improvements so that PBX's are very versatile, employing state of the art digital switching techniques. Even though digital or electronic switching telephone central offices have been available for a number of years, not all central offices are electronic switching central offices. Because central offices have historically employed analog telephone circuitry, some central offices still expect to receive an analog signal. Thus, the signal emanating from a telephone user's premises must be a signal compatible with the telephone central office equipment.

A PBX can facilitate communication between various telephones on a user's premises. A trunk line connects the PBX to the central office and enables a telephone user to call a telephone which is not connected to his PBX system but is connected to the central office or to a remote PBX. The trunk line connects the PBX to the central office enabling a call to be made through the PBX over the trunk line to the central office and from the central office to an individual telephone line or to another PBX connected to the central office. The PBX can also connect telephones to another PBX on the user's premises over a tie line connecting the two PBX's. It will be appreciated that for large systems, a large number of trunk lines is required to connect a PBX to the central office or to another PBX. One trunk or one tie line is needed for each conversation; however, it is a recognized telephone industry practice to take 24 conversations and put them on just two lines, one outgoing and one incoming. When this line is the trunk between the central office and the PBX, it is referred to as a T1 link.

Telephones throughout the world have a basic digitizing rate of 8 kHz. Data on the T1 link runs at 1.544 MHz which accounts for 24 8-bit telephone conversations with 1-bit overhead. This is the T1 rate. It will be appreciated that the telephone central office anticipates data over the T1 link at the T1 data rate so that any PBX connected to the central office must provide data at the T1 data rate. Because the telephone central office is a digital system with its own clock and the PBX is a different digital system with its own clock, there will be differences in the basic timing rate even when they are supposed to be the same. Accordingly, it will be appreciated that it would be highly desirable to match the PBX data rate to the T1 data rate.

As mentioned, T1 is a 24 channel network. Modern electronic telephones are 32 channel devices that interface with T1 with 8 channels leftover. Because both T1 and the electronic telephone are working at the basic telephone system 8 kHz rate, the electronic telephone or PBX has to run at 2.048 MHz in order to get 32 telephone conversations on one line to accommodate 8-bits per telephone conversation and 32 telephone conversations. On the other hand, T1 only has to run at 1.544 MHz with 8-bits per telephone conversation because it has to accommodate only 24 conversations. Because the PBX and T1 operate at different data rates, it will be appreciated that it would be highly desirable to transfer data between T1 and the PBX while automatically compensating for the difference in the data rates.

SUMMARY OF THE INVENTION

Briefly stated, in accordance with one aspect of the invention, a communications system comprises a PBX having multiple channels transmitting outbound PBX data at a preselected data rate and a T1 data link carrying T1 PCM data at a preselected data rate. Means are provided for interfacing the T1 data link and PBX with the T1 data occupying selected channels of the multiple channels. The interfacing means has an inbound data memory station and an outbound data memory station wherein inbound T1 data is looped back out the T1 data link and outbound PBX data is looped back out to the PBX.

In accordance with another aspect of the invention, a communications system has first and second data timing rates. Means are provided for generating T1 framing signals representative of frames of data and for synchronizing inbound and outbound data streams with the T1 framing signals. The communications system also includes means for receiving T1 PCM data from a T1 data link at the first data timing rate and means for delivering inbound T1 PCM data to a PBX having multiple channels with the T1 data occupying selected channels of the multiple channels. Means are provided for digitally attenuating or amplifying data through the system on a channel by channel basis and providing signal level matching. The communications system also includes means for providing data signal loopback wherein inbound T1 data is looped back out to the T1 data link and outbound PBX data is looped back out to the PBX.

In accordance with another aspect of the invention, a rate conversion apparatus comprises means for receiving an inbound data stream containing frames of data travelling at a first preselected data rate and means for interfacing the inbound data stream with a multi-channel system operating at a second preselected data rate with the inbound data occupying selected channels of the multi-channel system. The multi-channel system transmits an outbound data signal to the interfacing means. The conversion apparatus also includes means for attenuating and amplifying data on a channel by channel basis and means for generating framing signals representative of frames of the originally transmitted data. A synchronizing means synchronizes inbound and outbound streams of data with the framing signals. The rate conversion apparatus also includes means for selectively adding or deleting a frame of data and means for maximizing signal logic density in the outbound data stream when there are idle channels.

It is an object of the invention to provide an interface which performs all of the T1 functions. It is a feature of this invention that the T1 functions are performed by an interface which connects the T1 data link and the PBX with the T1 data occupying selected channels of the multiple channel PBX. The interface performs the T1 functions and additionally makes available unused channels for other purposes thereby efficiently using the communications channels.

It is an object of the present invention to provide a rate conversion apparatus which provides signal level matching without using expensive equipment. It is a feature of this invention that the foregoing object is accomplished by rate conversion apparatus which digitally attenuates or amplifies data through the system on a channel by channel basis to provide signal level matching. An advantage provided by this feature of the rate conversion apparatus is that inexpensive PCM conversion apparatus can be used.

It is an object of the invention to provide an efficient communications system having an easily tested rate conversion apparatus. It is a feature of this invention that the foregoing object is accomplished by providing data signal loopbacks wherein inbound T1 data is looped back out to the T1 data link and outbound PBX data is looped back out to the PBX. An advantage provided by this feature of the PCM rate conversion apparatus is effective and reliable testing of the PCM conversion apparatus and the PBX.

BRIEF DESCRIPTION OF THE DRAWINGS

FIG. 4 is a block diagram of the PCM transceiver of FIG. 1 and is connected to FIG. 2 along the indicated match line.

DETAILED DESCRIPTION OF THE PREFERRED EMBODIMENT

Figure 1:
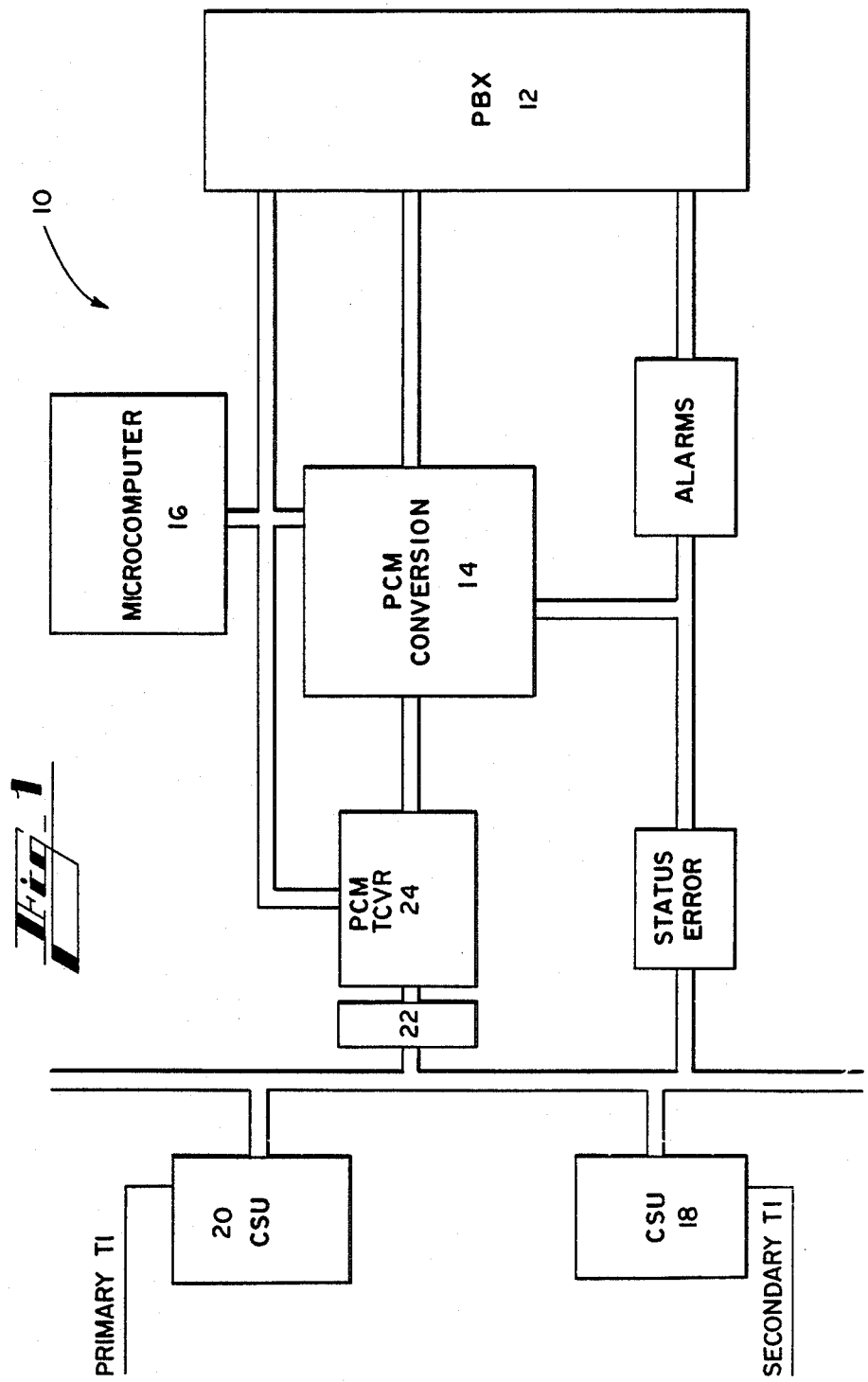
FIG. 1 is a block diagram of a preferred embodiment of a telephone communications system constructed in accordance with the present invention showing a T1 data link and PBX interfaced by PCM conversion apparatus.
Figure 3:
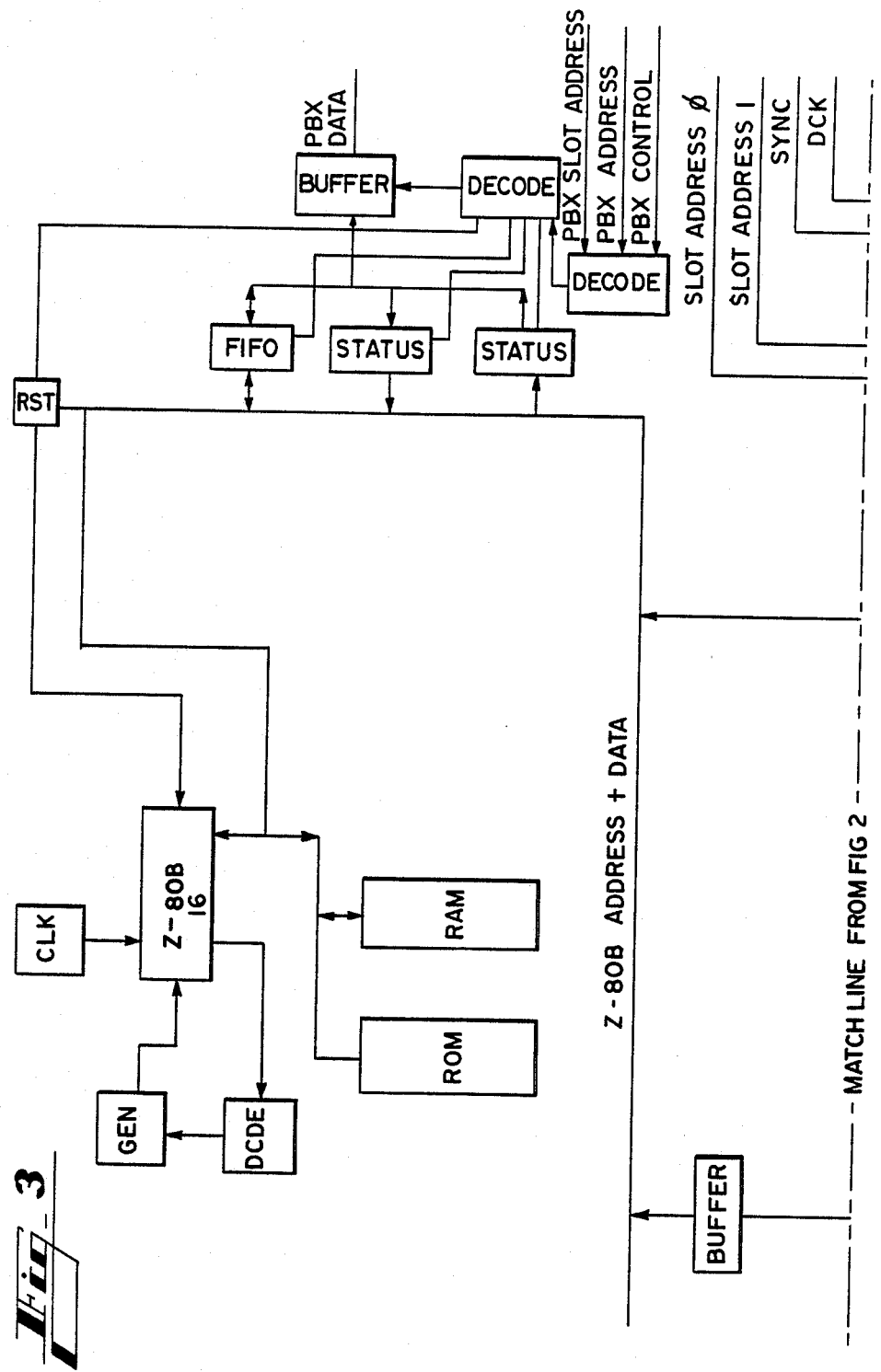
FIG. 3 is a block diagram of the PCM transciever of FIG. 1 and is connected to FIG. 2 along the indicated match line.

Referring to FIGS. 1 and 3, a communications system, such as a telephone communications system 10, facilitates voice and data communications. The communications system 10 illustrated includes a telephone exchange, such as a private branch exchange ("PBX") 12 receiving data from a T1 data link carrying pulse code modulated ("PCM") data at a preselected data rate. As is known in the art, pulse code modulation is a process in which an analog signal is sampled and the magnitude of each sample with respect to a fixed reference is quantisized and converted by coding to a digital signal. As is also known in the art, a T1 carrier system employs PCM multiplex equipment using 8-digit $\mu 255$ with law 24 channels or time slots. Signaling is typically performed by bit robbing. Mu law is the companding law typically used in North America. Companding is the process of dynamic range compression of a signal and subsequent expansion in accordance with a given transfer characteristic which is usually logarithmic. The purpose of companding is to allow transmission of the signal via a channel incapable of carrying the uncompressed dynamic range of the signal. In terms of digital transmission, this involves a reduction in the number of bits per sample and consequently the transmission bit rate compared to a linear coding law being used.

Referring to FIG. 1, the T1 data link comprises 24 channels each carrying an 8-bit data signal at a data rate of 1.544 Mbit/s. On the other hand, the PBX 12 has 32 8-bit channels and operates at a data rate of approximately 2.048 Mbit/s. A PCM conversion interface 14 interfaces the T1 data link and the PBX 12 with the T1 data occupying the first 24 channels of the 32 channels of the PBX 12. The PCM rate converter 14 interfaces the incoming T1 PCM data to the 32 channel or 32 port PBX group 12 with the T1 PCM data occupying the first 24 ports with the remaining 8 ports available for other uses.

The PCM conversion circuitry 14 implements three loopback modes for offline testing and online performance verification. The first loopback mode is an offline, all channel loopback from the 2.048 Mbit/s PBX 12 to the 1.544 Mbit/s T1 rate back to the 2.048 Mbit/s PBX 12. The second loopback mode is an offline, all channel loopback from the T1 1.544 Mbit/s input to the 2.048 Mbit/s PBX 12 rate back to the 1.544 Mbit/s output. The third loopback mode is an online, channel by channel loopback from the 2.048 Mbit/s PBX 12 input to the 2.048 Mbit/s side of the rate conversion circuitry 14 back to the 2.048 Mbit/s PBX 12 output. The first two loopback modes mentioned above are used for offline testing and the last loopback mentioned above is used for online performance verification. Data passing through the PCM converter 14 is digitially attenuated or amplified on a channel by channel basis to provide level matching. Parallel data from a microprocessor can be substituted in channel 24 for signaling purposes.

The basic clock rate of the T1 link can be different from the basic clock rate of the PBX 12 without destroying the quality of sound of the communications system 10. Basically, the PCM conversion circuitry 14 implements a four frame buffer in both directions for clean frame slips and de-jitter performance. This eliminates the need for external jitter attenuators. Optimally, the T1 data input/output and the PBX output/input are separated by two frames. If the separation becomes as small as one frame, the PCM conversion circuitry 14 will wait until the beginning of the frame and repeat the last frame, bringing the difference to two frames. If the separation is as large as three frames, the PCM conversion circuitry 14 will wait until the beginning of the frame and skip the last frame, again bringing the difference to two frames. As a result of the frame slips, the basic clock rate of the T1 link can be slightly different than the basic clock rate of the PBX and the system will continue to have good sound quality.

The PCM conversion circuitry 14 is a part of a T1 interface module for a PBX 12, such as the Senior EXEC System manufactured by Solid State Systems, Inc., 1300 Shiloh Road N.W., Kennesaw, Georgia, 30144. The entire module is controlled by the microcomputer 16. The microcomputer 16 preferably receives its intelligence from a Z -80B microprocessor operating at about 6 MHz. Memory resources include 32K bytes of ROM, and 8K bytes of RAM. Other resources include status indicators and peripheral bus interface circuitry. The microcomputer 16 receives its instructions from the PBX 12, performs the signaling functions, sets up the loopback modes, and, in addition, monitors the general condition of the system 10. Primary and secondary customer site units ("CSU") 18, 20 perform the functions required to comply with governmental requirements for line/local loopback, pulse density and other functions. The CSU's 18, 20 are preferably built into the PBX 12 forming an integral unit therewith instead of being mounted externally. Other aspects of a telephone system such as the Senior EXEC System are disclosed in co-filed U.S. patent applications Ser. Nos. 072,249 "SPACE AND TIME SWITCH-"—Reginald Ratcliff; 072,059 "SPACE AND TIME SWITCH"—Reginald Ratcliff; and 072,254 "CONFERENCING BRIDGE"—Reginald Ratcliff; and are incorporated herein by reference.

Still referring to FIG. 1, block 22 represents the receive/transmit buffer, clock extraction and phase locked loop for recovering the originally transmitted data and the original data clock. No attempt is made to de-jitter the receive clock in this section as the PCM conversion circuitry 14 receive section is immune to jittered data and clock. The phase locked loop de-jitters the received clock so that the transmit data is jitter free. The PCM transceiver 24 synchronizes the incoming and outgoing data streams with the T1 framing signals. The PCM transceiver 24 also performs the robbed bit signaling that is characteristic of most T1 installations.

Figure 2:
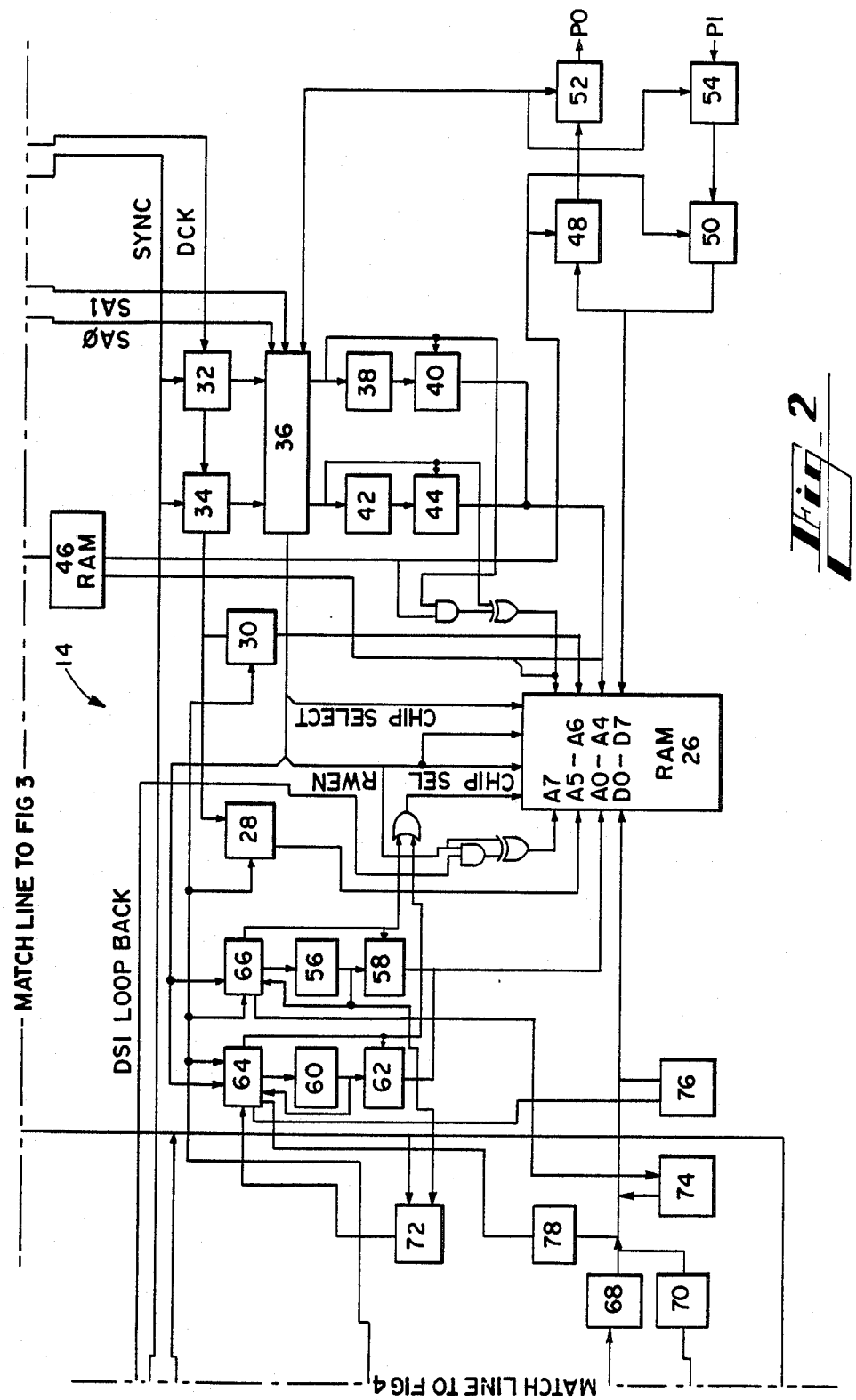
FIG. 2 is a block diagram of the PCM conversion apparatus of FIG. 1 and is connected to FIGS. 3 and 4 along the indicated match lines.
Figure 2A:
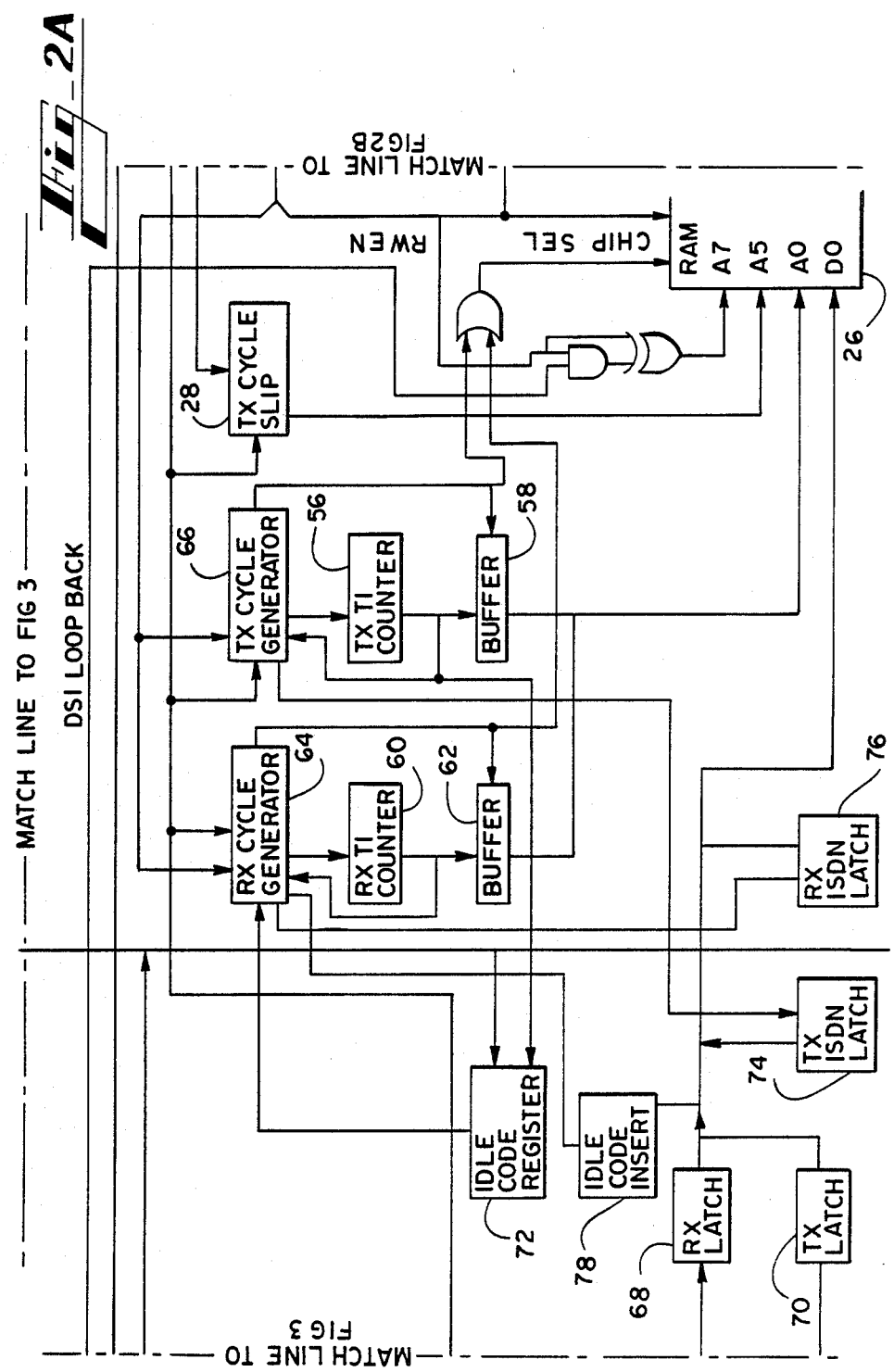
FIG. 2a is a somewhat enlarged block diagram of the left portion of the apparatus of FIG. 2 with descriptive labels added and is connected to FIGS. 2b and 3 along the indicated match lines.
Figure 2B:
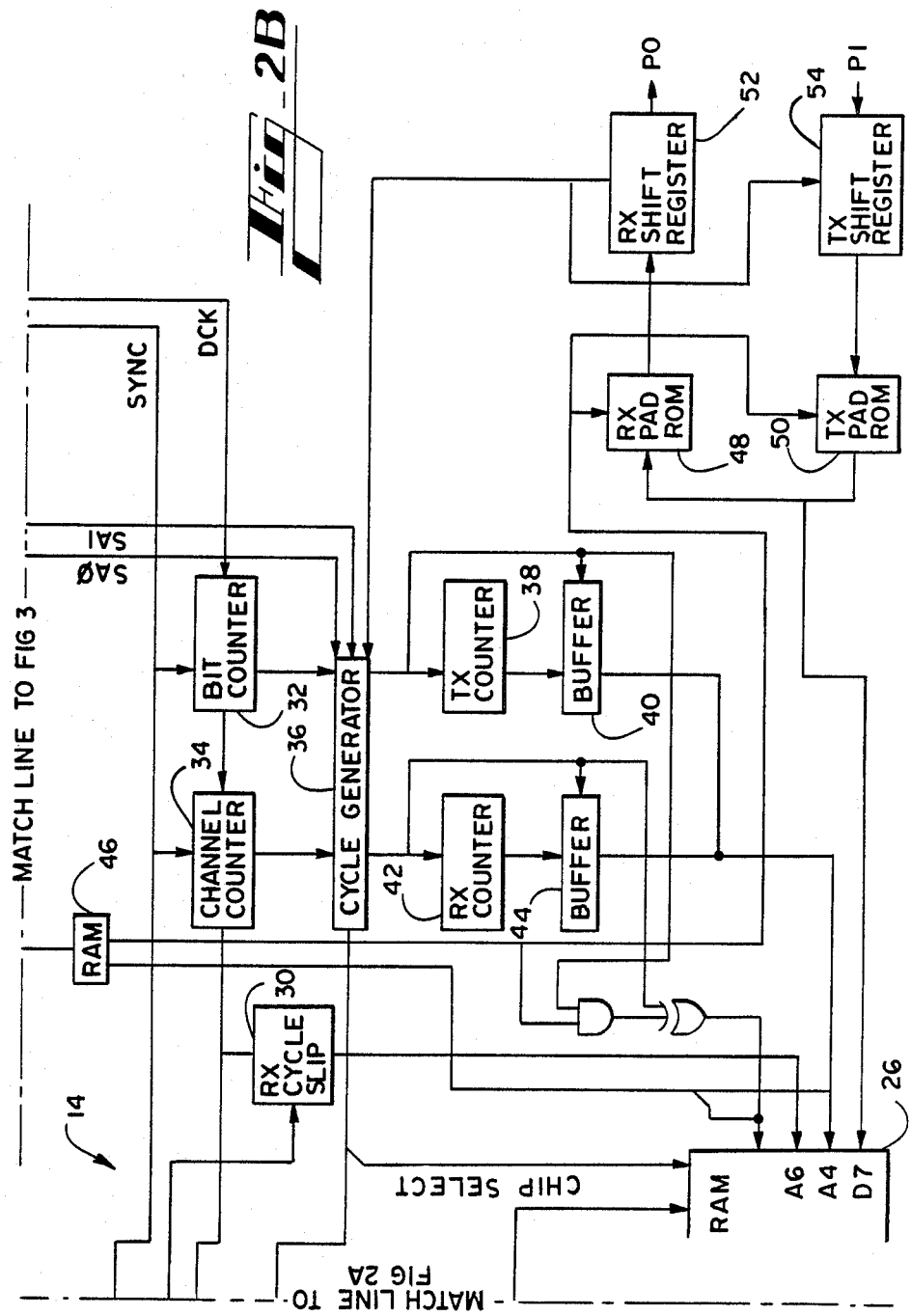
FIG. 2b is a somewhat enlarged block diagram of the right portion of the apparatus of FIG. 2 with descriptive labels added and is connected to FIGS. 2a and 3 along the indicated match lines.

Referring now to FIGS. 2-4, the PCM conversion circuitry 14 includes a dual port RAM 26 which is the boundary where the data changes from the PBX rate of 2.048 Mbit/s to the T1 rate of 1.544 Mbit/s. All of the inputs and outputs are ultimately slaved to the PBX 12 because it is the system with the higher rate. The receive data storage and the transmit data storage occupy two different areas of memory in RAM 26 selected by address bit A7. Each data storage area contains four frames selected by A5 and A6. These frames of data are used by the TX cycle slip logic 28 and 30. Each frame contains 32 bytes of storage, although only the first 24 bytes are used. These are addressed using address bits A0-A4 of RAM 26. Other components of the PCM conversion circuitry 14 include a bit counter 32, a channel counter 34, a cycle generator 36, a TX counter 38 and buffer 40, and an RX counter 42 and buffer 44.

The bit counter 32 keeps track of the current bit of the current channel on both PBX PCM highways. The counter 32 is reset when a synchronization pulse over line SYNC comes along at the beginning of a frame. When 8-bits are counted, a pulse is sent to the channel counter 34 indicating another channel and the bit counter 32 is reset. The channel counter 34 keeps track of the current channel of both PCM highways. As each channel's data flows through the PCM highway, the channel counter 34 increments. The channel counter 34 is reset when the SYNC pulse comes along and also when 32 channels have been counted.

The cycle generator 36 decodes the output of the bit counter 32 and channel counter 34 and generates timing signals. It is a raw decode with the counters 32, 34 providing an input state. As the channels of data pass through the system, each increment of the bit counter 32 enables the channel counter 34 to proceed to the next channel. The output pattern generated corresponds to the timing diagram of FIG. 5. A CHIP SELECT to dual port RAM 26 is only allowed when the CSEN timing signal is low. A read from dual port RAM 26 is only allowed when timing signal RWEN is high and a write to dual port RAM 26 is only allowed when timing signal RWEN is low. This prevents any address collisions in dual port RAM 26.

The TX counter 38 contains a counter for the transmit data input. The TX counter 38 is reset by cycle generator 36 so that the TX counter 38 is one channel behind the channel counter 34. This is because the data to transmit is not available until the end of the current PCM highway channel. The RX counter 42 contains a counter for the receive data output. The RX counter 42 is reset by the cycle generator 36 so the RX counter 42 is one channel ahead of the channel counter 34. This is needed to have the receive data ready when the next PCM highway channel begins. The buffers 40 and 44 enable the output of the counters 38, 42 to be presented to the dual port RAM 26 at the proper time. The outputs of the buffers 40 and 44 are also presented to a second dual port RAM 46.

When the SYNC pulse arrives from the PBX 12 indicating the beginning of a frame, the channel and bit counters 34, 32 are reset. The bit counter 32 counts the bits coming from the PBX 12, wrapping around every 8-bits and incrementing the channel counter 34. The channel counter 34 reflects the channel currently being communicated along the PCM highway. Because the received data must be already loaded into the shift register, the RX counter 42 is running one channel ahead. Likewise, the transmit data is not available in its register until all of its bits are shifted in, so the TX counter 38 is running one character behind. Because the RX and TX counters 42, 38 generate A0-A4 on the right side of dual port RAM 26, the data is placed into the dual port RAM 26 such that the first time slot on the PCM highway is in the lowest memory location for that frame and the last time slot is in the highest memory location for that frame.

The PCM conversion circuitry 14 also includes RX pad ROM 48, and TX pad ROM 50, RX shift register 52 and TX shift register 54. The RX and TX pad ROMs 48 and 50 each consist of 4K-by-8 ROMs that contain 16 different areas of 256 byte blocks of data. For each possible value of PCM data, there are 16 corresponding values in the ROM which amount to 16 different attenuation/gain settings. These are programmable settings. The RX shift block is a latch followed by a shift register. The data from dual port RAM 26 is latched into this latch. When the shift register shifts out the current channel's data, the contents of the latch are loaded into the shift register and the next channel's data begins to be shifted out. The TX shift block is a shift register followed by a latch. The data on the P1 PCM highway is shifted into the shift register until an entire byte is shifted in. When the data is shifted in, the data is latched and the shift register starts shifting in the next byte.

The same address used to address dual port RAM 26 is used to address dual port RAM 46. Dual port RAM 46 contains the attenuation setting and loopback setting for the current channel and direction. The lower four bits of output data of dual RAM 46 output data is applied to the upper four address bits of the 4K-by-8 pad ROMs 48 and 50. The data passing through the pad ROMs 48, 50 is converted to a value which corresponds to what it would be if an attenuated signal had been generated.

Still referring to FIGS. 2-4, the PCM conversion circuitry 14 includes TX T1 counter 56, buffer 58, RX T1 counter 60, buffer 62, and RX and TX cycle generators 64 and 66. The TX T1 counter 56 is one count ahead of the actual character being transmitted on the T1 link. In this way, when the PCM transceiver 24 requests a byte of data, the correct byte of data is supplied. The counter 56 is reset when the PCM transceiver 24 generates a transmit SYNC pulse, indicating the beginning of the next frame. The RX T1 counter 60 is one count behind the actual character being received from the T1 data link. In this manner, the byte that is in the RX latch 68 gets put into the correct memory location in dual port RAM 26. The TX cycle generator 66 detects the need to load the next byte into the TX latch 70. The TX cycle generator 66 waits until signal RWEN is high and signal CSEN is low. If the appropriate bit in the idle code register 72 is set, the idle code register 72 gates an idle code onto the data bus and latches the idle code into the TX latch 70. If the current channel is 24 and the control computer 16 has set the ISDN bit, the cycle generator 66 gates the byte in the TX ISDN register 74 onto the data bus and latches the byte into the TX latch 70. This is preferably accomplished using two flip-flops and combinational logic.

The RX cycle generator 64 detects the presence of a byte in the RX latch 68 and waits until signal RWEN is low and signal CSEN is low. If the microcomputer 16 has set the ISDN bit and if the current channel is 24, the received data is gated into the RX ISDN latch 76 for a later reading by the computer 16. Otherwise, a dual port RAM CHIP SELECT is generated and the data is written into dual port RAM 26. This is also preferably implemented using two flip-flops and combinational logic.

The idle code register 72 contains 24 bits which can be set or reset by the microcomputer 16. Each bit is selected depending on which channel of the TX T1 counter 56 is active and is used by the TX cycle generator circuit 66 to control where the transmit data byte comes from. The idle insert 78 is a buffer which can be enabled by the TX cycle generator circuit 64 whenever the cycle generator circuit 64 wants to place an idle code onto the data bus. The TX ISDN latch 74 is set up so that the computer 16 can place data onto the latch and the TX cycle generator circuit 66 can send that data out the T1 link. The RX ISDN latch 68 is set up so that the TX cycle generator 64 can place data from the T1 link onto the latch 68 and the computer 16 can read the data.

The TX cycle slip and RX cycle slip circuits 28 and 30 are identical except that one performs the frame monitoring in the transmit direction and the other one performs the frame monitoring in the receive direction. Each contains two 2-bit counters, one being the input frame count and the other being the output frame count. These are preferably implemented using two flip-flops each. Combinational logic determines when both the input and the output streams are processing channel zero at the same time. If they are, the input and the output counter values are compared. If the counts are not two apart, the output counter is forced to two apart. Additional combinational logic and two flip-flops latch the fact that a frame slip took place and the direction of the slip so that the computer 16 can use the information for diagnostic purposes.

The RX T1 cycle generator 64 and the RX T1 counter 60 is the section responsible for receiving the data from the PCM transceiver 24 and placing it in the right location in the dual port RAM 26. When the receive SYNC pulse arrives from the transceiver 24 indicating the beginning of a receive frame, the counter 60 is reset. The first byte that is latched by the RX latch 68 after that is the T1 channel one data. The data is placed in dual port RAM 26 with T1's channel one data occupying the highest memory location and with T1's channel 24 data occupying the lowest memory location in the current frame being loaded. If the current channel is 24 and the control computer 16 has selected ISDN mode, the received data is latched into the RX ISDN 76 section so that the computer can receive signaling in channel 24.

The TX T1 cycle generator 66 and the TX T1 counter 56, as well as idle code register 72 and idle code insert 78 form the section responsible for transmitting data to the transceiver 24 from the right location in dual port RAM 26 or transmitting an idle code if the channel is currently unused. When the transmit SYNC signal arrives from the transceiver 24, the transmit counter is reset and the next byte to go out is the T1 channel one outgoing data. The data is retrieved from the dual port RAM's current outgoing frame if the channel is active. If the channel is non-active, the output of the idle code register 72 is active, the RAM CHIP SELECT is inhibited and the idle code is inserted into that channel instead. The control computer 16 is responsible for loading the idle code register 72 with each channel's active status. If the computer 16 has selected the ISDN mode and the current channel is 24, the RAM CHIP SELECT is also inhibited and the data contained in the TX ISDN register 74 is sent instead.

Operation of the present invention is believed to be apparent from the foregoing description but a few words will be added for emphasis. Dual port RAM 26 is set up to store up to four frames of data. The cycle slip logic 28, 30 contains four 2-bit frame counters; one for the receive direction input, one for the receive direction output, one for the transmit direction input and one for the transmit direction output. If there is no frame slip in progress, the counters increment once every time a frame goes through the system. The output of the receive direction input frame counter is applied to the left side A5 and A6 address terminals of dual port RAM 26 when receiving a byte of data from the T1 data link. The output of the receive direction output frame counter is applied to the right side address terminals, A5 and A6, of dual port RAM 26 when outputting a byte to the PBX PCM highway. The output of the transmit direction input frame counter is applied to the right side address terminals, A5 and A6, of dual port RAM 26 when inputting a byte from the PBX's PCM highway. The output of the transmit direction output frame counter is applied to the left side address terminals, A5 and A6, of dual port RAM 26 when sending a byte to the T1 data link.

When the receive channel number is one and the PBX channel number is zero, the receive frame counters are compared. If the difference between the frame counters is two, no action is taken. If the difference between the frame counters is one, the receive channel output counter is jammed so that its count is two different from the receive channel input counter. This has the effect of repeating the last frame of data. If the difference between the frame counters is three, the receive channel output counter is jammed such that its count is two different from the receive channel input counter. This has the effect of deleting the last frame of data. The difference is never allowed to get to zero, but if it does, the count is still jammed to two. When the computer 16 is in the failure state, it asserts a signal jamming the count to two. A similar sequence of events takes place on the transmit channel with the transmit output counter being jammed.

Characters of data are routed through the PCM conversion circuitry 14 as described below. The data on the PBX's PCM highway PI is shifted into the TX shift register 54 and latched when a full byte is in. The latched data is applied to the lower eight address lines of the TX pad ROM 50. The cycle generator 36 is in the transmit mode at this time meaning that the output of the TX counter 38 is applied to both dual port RAMs 26 and 46. Also, a signal indicating operation in the transmit mode is applied to both address terminals, A7 of dual port RAM 26 and A7 of dual port RAM 46. This causes the attenuation setting for the current transmit channel to be applied to the upper four address bits of the TX pad ROM 50. In the transmit mode, the TX pad ROM 50 is enabled and its data is placed on the common data bus. This data is the PCM adjusted for a gain/attenuation factor.

During each channel, the cycle generator 36 generates two opportunities to write to dual port RAM 26 and two opportunities to read from dual port RAM 26. When the first opportunity to write to dual port RAM 26 comes along, the cycle generator 36 generates a CHIP SELECT for the dual port RAM 26 and the data to transmit is placed into its memory location. After the data to transmit is safely stored, the cycle generator 36 switches to the receive mode. This act of switching to the receive mode increments the TX counter 38, disables the TX counter buffer 40, enables RX counter buffer 44 and disables the TX pad ROM 50. The output of RX counter 42 is applied to address terminals A0 through A4 of both dual port RAM 26 and dual port RAM 46. The receive pad setting is applied to the upper four address bits of the RX pad ROM 48 and a loopback control bit is output on dual port RAM 46's bit -7. This bit controls which address space in dual port RAM 26 is selected by its A7. If loopback is not active on the current receive channel, the address space which had been loaded by the T1 side is selected. If loopback is active on the current receive channel, the address space loaded by the PBX 12 is selected.

When the next opportunity to read from dual port RAM 26 comes along, the cycle generator 36 generates a CHIP SELECT and the data corresponding to the next channel on PCM highway P0 is applied to the lower eight address lines of RX pad ROM 48. The data is attenuated or amplified and output on the data lines of the pad ROM 48. The cycle generator 36 generates a latch pulse which latches the data into the RX shift register 52 and increments RX counter 42. When it is time to send the data down PCM highway P0, the data is loaded into the shift register and sent down the PCM highway.

On the other side of dual port RAM 26, data is being sent to and received from the T1 link. When a byte of data is received from the T1 link, the PCM transceiver 24 latches the data into the RX latch 68. The RX cycle generator 64 detects the presence of a data in the RX latch 68 and waits for the first opportunity to write to dual port RAM 26. When this opportunity comes along, the RX cycle generator 64 enables a buffer 62 placing the current channel count onto address terminals A0-A4 of dual port RAM 26. The RX cycle slip 30 places the current received input frame count onto address terminals A5 and A6, and A7 is set so that the receive address range is selected. The RX cycle generator 66 then generates a CHIP SELECT to dual port RAM 26 and the receive data is stored. After the data is stored, the RX T1 counter 60 is decremented to the next channel.

When the T1 link has retrieved a byte of data from the TX latch 70, the TX cycle generator 66 starts retrieving the next byte to be sent. It first waits until an opportunity to read from dual port RAM 26 comes along. It then checks the appropriate idle code register 72 for a need to insert an idle code. If an idle code should be inserted, and idle code is latched into the TX latch 70. If an idle code is not to be inserted, a buffer is enabled which places the TX T1 counter 56 on address terminals A0 through A4 of dual port RAM 26 and the current transmit outgoing frame on address ports A5 and A6 of dual port RAM 26. If the computer 16 has selected a DS1 loopback, port A7 is set to access the address range corresponding to the T1 receive data. In this manner, data can be received from the T1 link and sent back out the T1 link. If the computer 16 has not selected DS1 loopback, port A7 is set to access the PBX transmit data address range. Wherever the data comes from, it is latched into the TX latch 70 and the TX counter is decremented.

It can now be appreciated that a PCM conversion unit has been presented which interfaces a T1 data link and a PBX. The PCM conversion module plugs into a PBX and provides all of the T1 functions. Because the PBX PCM highway contains 32 channels per frame and T1 contains only 24 channels per frame, there are eight unused channels. Instead of wasting these channels as some systems do, these eight unused channels are available for signaling or other uses. The rate conversion circuitry can run well with asynchronous clocks as long as the data is digitized voice. There is no need to slave the PBX to the incoming T1 clock as is the case in some systems. Diagnostic information is also available for processing. The PCM conversion module provides up to 16 levels of attenuation/gain that is programmable on a per channel and per direction basis. The transmit and receive channels can be completely asynchronous. In the PCM conversion module, the data passes through a dual port RAM which is rate independent. A state machine guarantees that there is no access collision in the dual port RAM. There are 8K bytes of attenuation/gain storage which provide 16 different programmable settings in the transmit direction and 16 in the receive direction. A programmable idle code insertion device maximizes the ones density in the outgoing stream when there are idle channels. A slip detection and generation device detects when there is a need to add or delete a frame. At the frame boundary, the slip generation circuit will either add or delete an entire frame.

While the invention has been described with reference to a preferred embodiment, it will be understood by those skilled in the art that various changes may be made and equivalents may be substituted for elements or components thereof without departing from the true spirit and scope of the invention. In addition, many modifications may be made to adapt a particular situation and material to the teachings of the invention without departing from the essential teachings of the present invention. Thus, the present invention is not limited to PBX telephone systems but can be used in other telephone switching systems, data communications systems, paging terminals, voice storage systems, and other systems requiring an interface between two devices or systems operating at different rates.

I claim:

1. A communications system, comprising:
    a first signaling unit having multiple channels and transmitting outbound data at a preselected data rate;
    a signaling link carrying inbound data at a preselected data rate; and
    means, containing a single dual port RAM, for interfacing the signaling link and the first signaling unit with the inbound data occupying selected channels of said multiple channels, said dual port RAM having an inbound data memory station and an outbound data memory station wherein said inbound data is controllably looped back out through said dual port RAM to the signaling link and said outbound data is controllably looped back through said dual port RAM out to the signaling unit.

2. A communications system, according to claim 1, wherein the signaling link is a T1 link carrying PCM data and the signaling unit is a 32 channel PBX with the T1 data occupying 24 of the 32 channels.

3. A communications system, according to claim 1, wherein the inbound data rate is approximately 1.544 megabits per second and the outbound data rate is approximately 2.048 megabits per second.

4. A communications system, according to claim 1, wherein data on any unused channel is looped back.

5. A communications system, according to claim 1, wherein the outbound data preselected data rate is approximately 2 megabits per second and the inbound data preselected data rate is approximately 1.5 megabits per second, and wherein said interfacing means implements loopback on all channels from the 2 megabit per second signaling unit to the 1.5 megabit per second rate back to the 2 megabit per second signaling unit.

6. A communications system, according to claim 1, wherein the outbound data preselected data rate is approximately 2 megabits per second and the inbound data preselected data rate is approximately 1.5 megabits per second, and wherein said interfacing means implements loopback of all channels from the 1.5 megabit per second input to the 2 megabit per second signaling unit rate back to the 1.5 megabit per second output.

7. A communications system, according to claim 1, wherein the outbound data preselected data rate is approximately 2 megabits per second and the inbound data preselected data rate is approximately 1.5 megabits per second, and wherein said interfacing means implements loopback on a channel by channel basis from the 2 megabits per second signaling unit input to the 2 megabit per second side of the data memory back to the 2 megabit per second signaling unit output.

8. A communications system, according to claim 1, wherein said interfacing means provides three modes of loopback for offline testing and online performance verification.

9. A communications system, according to claim 1, including means for digitally attenuating or amplifying data passing through said interfacing means on a channel by channel basis.

10. A communications system, according to claim 1, including means for substituting an idle code in any unused channel for the outbound data coming from the signaling unit.

11. A communications system, according to claim 1, including means for separating the inbound data input/output and the outbound data output/input by two data frames.

12. A communications system, according to claim 11, including means for maintaining the frame separation at two data frames.

13. A communications system, according to claim 1, wherein said interfacing means comprises a slip detector and generator and means for converting between the inbound and outbound data rates.

14. A communications system, according to claim 1, including a customer site unit integrally mounted on said first signaling unit.

15. A unitary PCM rate converter and multiframe buffer, comprising:
    means for receiving inbound data from a data link at a first data timing rate;
    means for receiving outbound data at a second data timing rate from a signaling unit having multiple channels;
    means for generating framing signals representative of frames of data; said generating means including a frame counter, a slip detector and generator, and a frame buffer controlled by said frame counter and said slip detector and generator;
    means for synchronizing inbound and outbound data streams with the framing signals;
    means for delivering said inbound data to said signaling unit with said inbound data occupying selected channels of said multiple channels;
    means for digitally attenuating and amplifying data through the system on a channel-by-channel basis; and
    means for providing data signal loopback wherein said inbound data is looped back out to said data link and said outbound data is looped back out to said signaling unit; said loopback means including a dual port RAM having input and output inbound data ports and input and output outbound data ports.

16. A converter and buffer, according to claim 15, wherein said means for digitally attenuating and amplifying data comprises sixteen different programmable attenuation/gain settings per channel per direction.

17. A converter and buffer, according to claim 15, wherein data on any unused channel is looped back.

18. A converter and buffer, according to claim 15, wherein the outbound data timing rate is approximately 2 megabits per second and the inbound data timing rate is approximately 1.5 megabits per second, and wherein said dual port RAM implements loopback on all channels from the 2 megabit per second signaling unit to the 1.5 megabit per second rate back to the 2 megabit per second signaling unit.

19. A converter and buffer, according to claim 15, wherein the outbound data timing rate is approximately 2 megabits per second and the inbound data timing rate is approximately 1.5 megabits per second, and wherein said dual port RAM implements loopback of all channels from the 1.5 megabit per second input to the 2 megabit per second signaling unit rate back to the 1.5 megabit per second output.

20. A converter and buffer, according to claim 15, wherein the outbound data timing rate is approximately 2 megabits per second and the inbound data timing rate is approximately 1.5 megabits per second, and wherein said dual port RAM implements loopback on a channel by channel basis from the 2 megabit per second signaling unit input to the 2 megabit per second side of the dual port RAM to the 2 megabit per second signaling unit output.

21. A converter and buffer, according to claim 15, wherein said dual port RAM provides three modes of loopback for offline testing and online performance verification.

22. A converter and buffer, according to claim 15, including means for substituting an idle code in any unused channel for the outbound data coming from the signaling unit.

23. A converter and buffer, according to claim 15, including means for separating the inbound data input/output and the outbound data output/input by two data frames.

24. A converter and buffer, according to claim 23, including means for maintaining the frame separation at two data frames.

25. A converter and buffer, according to claim 15, including a customer site unit integrally mounted on said signaling unit.

26. A communications system having first and second data timing rates, comprising
  means for generating T1 framing signals representative of frames of data;
  means for synchronizing inbound and outbound data streams with the T1 framing signals
  means for receiving T1 PCM data from a T1 data link at said first data timing rate;
  means for delivering inbound T1 PCM data to a PBX having multiple channels with said T1 data occupying selected channels of said multiple channels;
  means for digitally attenuating or amplifying data through the system on a channel-by-channel basis and providing signal level matching;
  means for providing data signal loopback wherein inbound T1 data is looped back out to said T1 link and outbound PBX data is looped back out to said PBX; and
  means for separating the inbound data input/output and the outbound data output/input by two data frames.

27. A communications system, according to claim 26, wherein said means for generating T1 framing signals comprises:
  a frame counter;
  a slip detector and generator; and
  a frame buffer controlled by said frame counter and said slip detector and generator.

28. A communications system, according to claim 26, wherein said means for digitally attenuating and amplifying data comprises sixteen different programmable attenuation/gain settings per channel per direction.

29. A communications system, according to claim 26, wherein said means for providing loopback comprises a dual port RAM having input and output inbound data ports and input and output outbound data ports.

30. A communications system, according to claim 29, wherein the outbound data timing rate is approximately 2 megabits per second and the inbound data timing rate is approximately 1.5 megabits per second, and wherein said dual port RAM implements loopback on all channels from the 2 megabit per second PBX to the 1.5 megabits per second rate back to the 2 megabit per second PBX.

31. A communications system, according to claim 29, wherein the outbound data timing rate is approximately 2 megabits per second and the inbound data timing rate is approximately 1.5 megabits per second, and wherein said dual port RAM implements loopback of all channels from the 1.5 megabit per second input to the 2 megabits per second PBX rate back to the 1.5 megabit per second output.

32. A communications system, according to claim 29, wherein the outbound data timing rate is approximately 2 megabits per second and the inbound data timing rate is approximately 1.5 megabits per second, and wherein said dual port RAM implements loopback on a channel by channel basis from the 2 megabit per second PBX input to the 2 megabit per second side of the dual port RAM to the 2 megabit per second PBX output.

33. A communcations system, according to claim 29, wherein said dual port RAM provides three modes of loopback for offline testing and online performance verification.

34. A communications system, according to claim 29, including means for substituting an idle code in any unused channel for the outbound data coming from the PBX.

35. A communications system, according to claim 29, including means for maintaining the frame separation at two data frames.

36. A communications system, according to claim 26, including a customer site unit integrally mounted on said PBX.

37. A rate conversion and multiframe buffer apparatus, comprising:
  means for receiving an inbound data stream containing frames of data traveling at a first preselected data rate;
  means for interfacing said inbound data stream with a multichannel system operating at a second preselected data rate with the inbound data occupying selected channels of said multichannel system, said multichannel system transmitted an outbound data signal to said interfacing means;
  means for attenuating and amplifying data on a channel by channel basis;
  means for generating framing signals representative of frames of data;
  means for synchronizing inbound and outbound streams of data with said framing signals;
  means for selectivity adding or deleting a frame of data;
  a dual port RAM having input and output inbound data ports and input and output outbound data ports;
  means for separating the inbound data input/output and the outbound data output/input by two data frames and maintaining the frame separation at two data frames thereby forming a four frame buffer; and
  means for maximizing signal pulse density in the outbound data stream when there are idle channels.

38. A rate conversion and multiframe buffer apparatus, according to claim 37, wherein said means for attenuating and amplifying data comprises sixteen different programmable attenuation/gain setting per channel per direction.

39. A rate conversion and multiframe buffer apparatus, according to claim 37, including means for providing loopback.

40. A rate conversion and multiframe buffer apparatus, according to claim 39, wherein data on any unused channel is looped back.

41. A rate conversion and multiframe buffer apparatus, according to claim 37, wherein the outbound data rate is approximately 2 megabits per second and the inbound data rate is approximately 1.5 megabits per second, and wherein said dual port RAM implements loopback on all channels from the 2 megabits per second multichannel system to the 1.5 megabit per second rate back to the 2 megabit per second multichannel system.

42. A rate conversion and multiframe buffer apparatus, according to claim 37, wherein the outbound data rate is approximately 2 megabits per second and the inbound data rate is approximately 1.5 megabits per second, and wherein said dual port RAM implements loopback of all channels from the 1.5 megabit per second input to the 2 megabit per second multichannel system rate back to the 1.5 megabit per second output.

43. A rate conversion and multiframe buffer apparatus, according to claim 37, wherein the outbound data rate is approximately 2 megabits per second and the inbound data rate is approximately 1.5 megabits per second, and wherein said dual port RAM implements loopback on a channel by channel basis from the 2 megabit per second multichannel system input to the 2 megabit per second side of the dual port RAM to the 2 megabit per second multichannel system output.

44. A rate conversion and multiframe buffer apparatus, according to claim 37, wherein said dual port RAM provides three modes of loopback for offline testing and online performance verification.

45. A rate conversion and multiframe buffer apparatus, according to claim 37, including means for substituting an idle code in any unused channel for the outbound data coming from the multichannel system.

46. A rate conversion and multiframe buffer apparatus, according to claim 37, wherein said means for maximizing signal pulse density includes means for substituting an idle code in any unused channel for the outbound data coming from the multichannel system.

47. A rate conversion and multiframe buffer apparatus, according to claim 37, including a customer site unit integrally mounted on said multichannel unit.

48. A unitary rate conversion and multiframe buffer apparatus, comprising:
means for receiving an inbound data stream containing frames of T1 PCM data traveling at a first preselected data rate;
means for interfacing said inbound data stream with a multichannel PBX operating at a second preselected data rate with the inbound T1 PCM data occupying selected channels of said multichannel PBX, and PBX generating an outbound data signal at the second preselected data rate;
means for attenuating and amplifying data on a channel by channel basis;
means for generating T1 framing signals representative of frames of data;
means for synchronizing inbound and outbound streams of data with said T1 framing signals;
means for detecting and need to add or delete a frame of data;
means for adding or deleting a frame of data; and
means for maximizing signal pulse density in the outgoing data stream when there are idle channels.

49. A unitary rate conversion and multiframe buffer apparatus for interfacing an inbound data stream containing frames of T1 PCM data at a first preselected data rate with a multichannel PBX generating an outbound data stream at a second preselected data rate with the T1 data occupying selected channels of said multichannels, comprising:
means for attenuating and amplifying data on a channel by channel basis;
means for generating T1 framing signals representative of frames of data;
means for synchronizing inbound and outbound streams of data with said T1 framing signals;
means for adding or deleting a frame of data; and
means for maximizing signal pulse density in the outgoing data stream when there are idle channels.

* * * * *